(12) United States Patent
Nicoll

(10) Patent No.: US 8,795,532 B2
(45) Date of Patent: Aug. 5, 2014

(54) PROCESS FOR OPERATING A COOLING TOWER COMPRISING THE TREATMENT OF FEED WATER BY DIRECT OSMOSIS

(75) Inventor: Peter Nicoll, Surrey (GB)

(73) Assignee: Surrey Aquatechnology Ltd., Surrey (GB)

(*) Notice: Subject to any disclaimer, the term of this patent is extended or adjusted under 35 U.S.C. 154(b) by 375 days.

(21) Appl. No.: 13/132,832

(22) PCT Filed: Dec. 8, 2009

(86) PCT No.: PCT/GB2009/002842
§ 371 (c)(1),
(2), (4) Date: Jul. 20, 2011

(87) PCT Pub. No.: WO2010/067061
PCT Pub. Date: Jun. 17, 2010

(65) Prior Publication Data
US 2011/0278226 A1  Nov. 17, 2011

(30) Foreign Application Priority Data

Dec. 8, 2008 (GB) .................................. 0822361.2

(51) Int. Cl.
*B01D 61/58* (2006.01)
*B01D 61/10* (2006.01)
*B01D 17/12* (2006.01)
*B01D 35/18* (2006.01)

(52) U.S. Cl.
USPC ........... 210/651; 210/774; 210/805; 210/806; 210/790; 210/181; 165/900

(58) Field of Classification Search
None
See application file for complete search history.

(56) References Cited

U.S. PATENT DOCUMENTS

| | | | |
|---|---|---|---|
| 4,981,594 A | 1/1991 | Jones | |
| 2004/0050792 A1* | 3/2004 | Bonds et al. | 210/652 |
| 2006/0237366 A1* | 10/2006 | Al-Mayahi | 210/644 |
| 2007/0186574 A1* | 8/2007 | Al-Mayahi et al. | 62/286 |

FOREIGN PATENT DOCUMENTS

| | | |
|---|---|---|
| WO | 2005012185 A1 | 2/2005 |
| WO | 2005120688 A1 | 12/2005 |
| WO | 2008050087 A1 | 5/2008 |

* cited by examiner

*Primary Examiner* — Katherine Zalasky
(74) *Attorney, Agent, or Firm* — Whyte Hirschboeck Dudek S.C.

(57) ABSTRACT

A process for operating a cooling tower (10), said process comprising: introducing a feed solution into a cooling tower, evaporating solvent from the feed solution to produce a concentrated solution, removing a portion of the concentrated solution as blow-down, passing at least a portion of the blow-down through a first membrane in a nanofiltration unit (14), such that at least some of the solute in the blow-down are retained as a concentrated blow-down solution on the retentate-side of the first membrane, contacting at least a portion of the concentrated blow-down solution (42) with one side of a second membrane (12) and contacting a solution having a lower solute concentration than the combined concentrated blow-down solution and the return from the cooling tower with the opposite side of the second membrane, such that solvent flows across the second membrane to dilute the concentrated blow down solution by direct osmosis, and re-introducing the diluted blow-down solution to the cooling tower.

10 Claims, 1 Drawing Sheet

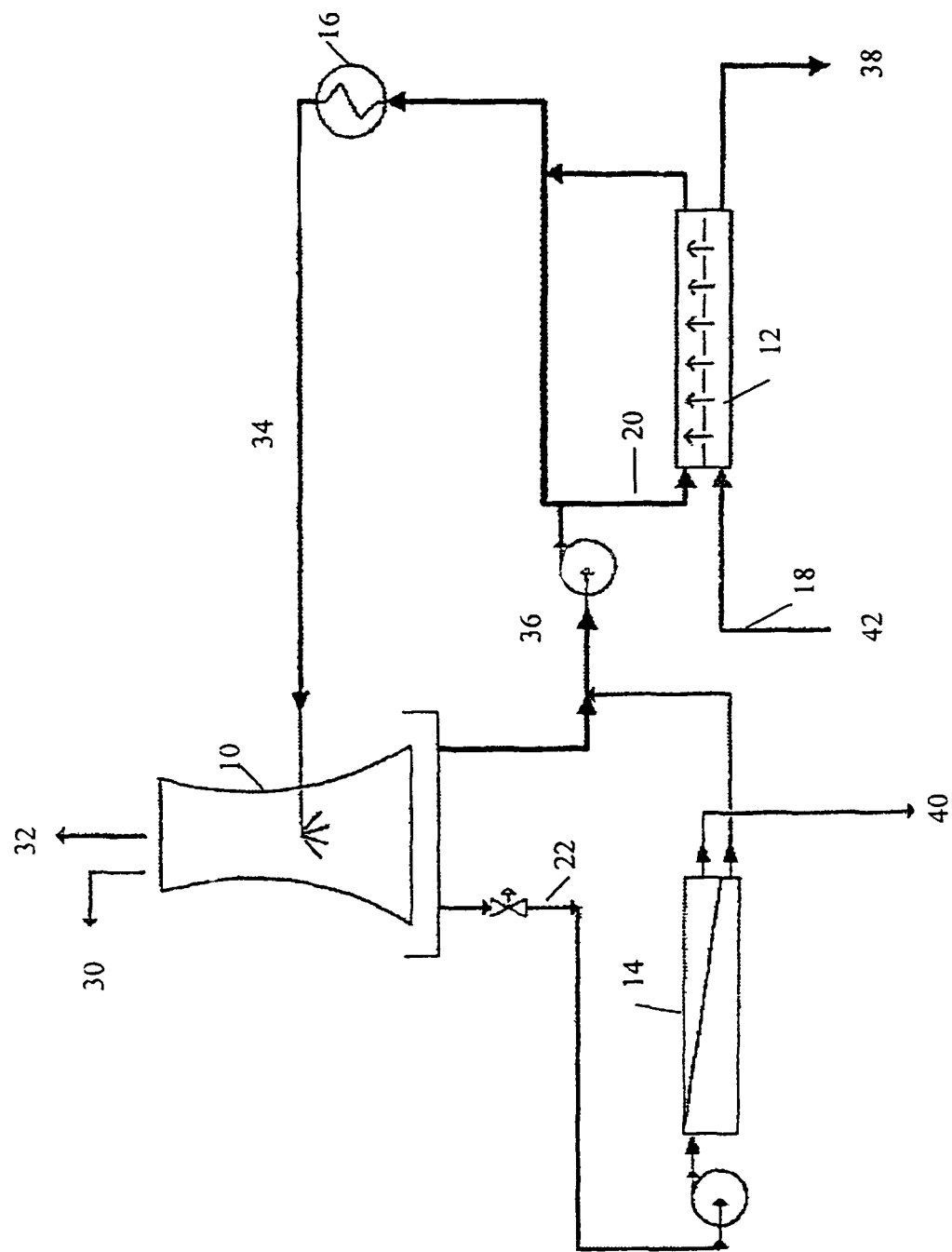

PROCESS FOR OPERATING A COOLING TOWER COMPRISING THE TREATMENT OF FEED WATER BY DIRECT OSMOSIS

The present invention relates to a method of operating a cooling tower.

Heat exchangers are often used to remove excess heat from industrial processes. Typical heat exchangers include shell and tube-type heat exchangers, which comprise a length of tubing partially enclosed within a housing or shell. An industrial process stream containing excess heat is introduced into the tubing, whilst a coolant, such as water, is passed through the shell via a separate inlet and outlet. The water removes excess heat from the process stream. Thus, the water exiting the shell is at a higher temperature than the coolant entering the shell. The heated water stream is cooled in a cooling tower before it is reintroduced into the shell. In this way, heat removal can be carried out in a continuous manner.

Most cooling towers contain a porous filler material, known as decking. Water is introduced into the top of the cooling tower and drips down through the decking, whilst air is blown through the decking, causing some of the water to evaporate. The loss of heat by evaporation (evaporative cooling) lowers the remaining water temperature. The cooled water is recirculated to the heat exchanger.

As evaporation occurs, contaminants, such as dissolved solids, build up in the recirculating water. Such contaminants can cause fouling, for example, as a result of biological growth, scale formation, corrosion and/or sludge deposition. The contaminant level may be reduced by removing a portion of the recirculating water from the system. The removal of water in this manner is known as blow-down.

To replace the water loss from the system, make-up water is introduced into the cooling tower. Various attempts have been made to treat this make-up water to reduce the risk of fouling. In WO 2005/120688, for example, the make-up water is formed by positioning a selectively permeable membrane between seawater and a clean solution of sodium chloride having a higher solute concentration than the seawater. The difference in osmotic potential causes water from the seawater side of the membrane to flow across the membrane to dilute the sodium chloride solution. This diluted sodium chloride solution is substantially free from the biological contaminants typically found in seawater and can be treated with anti-corrosion, anti-scaling and anti-fouling agents before being used as the make-up water for the system.

According to the present invention, there is provided a process for operating a cooling tower, said process comprising:

introducing a feed solution into a cooling tower, evaporating solvent from the feed solution to produce a concentrated solution, removing a portion of the concentrated solution as blow-down, passing at least a portion of the blow-down through a first membrane, such that at least some of the solute in the blow-down is retained as a concentrated blow-down solution on the retentate-side of the first membrane, contacting at least a portion of the concentrated blow-down solution with one side of a second membrane and contacting a solution having a lower solute concentration than the concentrated blow-down solution with the opposite side of the second membrane, such that solvent flows across the second membrane to dilute the concentrated blow down solution by direct osmosis, and re-introducing the diluted blow-down solution to the cooling tower.

In a preferred embodiment, the process further comprises positioning a membrane between a source solution and a draw solution having a higher solute concentration than the source solution, such that solvent from the source solution flows across the membrane to dilute the draw solution, introducing the diluted source solution into the cooling tower as the feed solution, evaporating solvent from the feed solution to produce a concentrated feed solution, and, optionally, reusing at least a portion of the concentrated feed solution as the draw solution.

The source solution may be an aqueous stream. Preferably, the aqueous stream is an impure stream, such as seawater, river water, lake water, rain water, brackish water and water from industrial process streams. Suitable industrial process streams may be derived from, for example, the salty residues of desalination plants, such as thermal desalination and/or reverse osmosis plants. Aqueous effluents, such as those typically employed as make-up water for conventional cooling towers, may also be used.

Any suitable solution having a higher solute concentration than the source solution may be used as the draw solution. The draw solution may be have a known composition. For example, in one embodiment, the draw solution is formed by introducing a known quantity of at least one solute into a known quantity of solvent. Thus, the draw solution may consist essentially of a selected solute(s) dissolved in a selected solvent, such as water. By forming the draw solution in this manner, a substantially clean solution may be produced. Thus, the draw solution may have a reduced concentration of suspended particles, biological matter and/or other components that may cause fouling of the cooling system. In a preferred embodiment, the draw solution is substantially free of suspended particles, biological matter and/or other components that may cause fouling of the cooling system.

In one embodiment, additives, such as scale inhibitors, corrosion inhibitors, biocides and/or dispersants, are included in the draw solution. By recirculating a portion of the draw solution through the cooling tower, these additives may be reused. Preferably, the bulk of the draw solution is recirculated in a closed loop, such that a large proportion of the components of the draw solution are retained within the loop. Thus, once the draw solution is formed, it may not be necessary to continuously add fresh solute and/or additives to the solution.

The solute (or osmotic agent) in the draw solution is preferably a water-soluble salt. Suitable salts include salts of ammonium and metals, such as alkali metals (e.g. Li, Na, K) and alkali earth metals (e.g. Mg and Ca). The salts may be fluorides, chlorides, bromides, iodides, sulphates, sulphites, sulphides, carbonates, hydrogencarbonates, nitrates, nitrites, nitrides, phosphates, aluminates, borates, bromates, carbides, chlorides, perchlorates, hypochlorates, chromates, fluorosilicates, fluorosilicates, fluorosulphates, silicates, cyanides and cyanates. One or more salts may be employed. In a preferred embodiment, the solute of the second solution is a potassium, magnesium or sodium salt in water.

As mentioned above, the source solution is placed on one side of a membrane, while the draw solution is placed on the opposite side of the membrane. As a result of the difference in osmotic potential between the solutions, solvent passes across the membrane to dilute the draw solution by direct osmosis. The flow occurs along a concentration gradient. Thus, high pressures are not required to induce solvent flow. However, a pressure differential across the membrane may be applied, for example, to increase the flux of solvent.

Any suitably selective membrane may be used in the direct osmosis step. An array of membranes may be employed. Suitable membranes include cellulose acetate (CA) and cellulose triacetate (CTA) (such as those described in McCutcheon et al., Desalination 174 (2005) 1-11) and polyamide (PA) membranes. The membrane may be planar or take the form of a tube or hollow fibre. Thin membranes may be employed, particularly, when a high pressure is not applied to induce solvent flow from the first solution to the second solution. If desired, the membrane may be supported on a supporting structure, such as a mesh support.

In one embodiment, one or more tubular membranes may be disposed within a housing or shell. The source solution may be introduced into the housing, whilst the draw solution may be introduced into the tubes. As the solvent concentration of the source solution is higher than that of the draw solution, solvent will diffuse across the membrane from the source solution into the draw solution. The diluted draw solution may be recovered from the interior of the tubes, whilst the concentrated first solution may be removed from the housing (or vice-versa).

When a planar membrane is employed, the sheet may be rolled such that it defines a spiral in cross-section.

The pore size of the membrane may be selected depending on the size of the solvent molecules that require separation. It may be possible to use a membrane having a pore size that allows two or more different types of solvent molecules to pass through the membrane. Preferably, the pore size of the membrane is selective to the passage of water. The pore size of the membrane is preferably selected to prevent the flow of solute and other contaminants from the source solution to the draw solution. Typical pore sizes range from 1 to 100 Angstroms, preferably 5 to 50 Angstroms, for example 10 to 40 Angstroms. Pore size may be inferred by using any suitable technique.

The flow of solvent across a membrane is generally influenced by thermal conditions. Thus, the solutions on either side of the membrane may be heated or cooled, if desired. The solutions may be heated to higher temperatures of 40 to 90° C., for example, 60 to 80° C. Alternatively, the solutions may be cooled to −20 to 40° C., for example, 5 to 20° C. The solution on one side of the membrane may be heated, while the other side cooled. The heating or cooling may be carried out on each solution independently. Chemical reactions may also be carried out on either side of the membrane, if desired.

To improve the efficacy of the osmosis step, the draw and/or source solution may be treated to reduce fouling and scaling of the membrane. Accordingly, anti-scaling and/or anti-fouling agents may be added to one or both solutions. Although not required, pressure may be applied to the first solution side of the membrane to increase the rate of flux of water across the membrane. For example, pressures of $1\times10^5$ Pa to $5\times10^5$ Pa [1 to 5 bar] may be applied, preferably pressures of $2\times10^5$ Pa to $4\times10^5$ Pa [2 to 4 bar]. Additionally or alternatively, the pressure on the second solution side of the membrane may be reduced. For example the pressure may be less than $1\times10^5$ Pa [1 bar], preferably less than $0.5\times10^5$ Pa [0.5 bar].

The viscosities of the source solution and/or the draw solution may also be modified to improve the rate of flux across the membrane. For example, viscosity modifying agents may be employed.

The process of the present invention may further comprise a pre-treatment step of removing contaminants, such as suspended particles and biological matter, from the source solution. Additionally or alternatively, a threshold inhibitor to control scaling may be added to the first solution. Pre-treatment steps to alter the pH of the first solution may also be employed. When seawater is used as a source, it is preferable to use a deep sea intake, as deep seawater typically contains fewer contaminants.

After solvent (e.g. water) from the source solution has passed into the draw solution, the draw solution may be at an elevated pressure (osmotic pressure when water is used as a solvent). This pressure may be used to aid the transfer of the draw solution to subsequent processing steps of the present invention. This pressure may be sufficient to transfer the draw solution into the cooling tower, for example, without or with fewer or less powerful pumps. In one embodiment, excess pressure is converted into mechanical work. Thus, the pressure (e.g. osmotic pressure) generated in the draw solution may be used to reduce the power consumption and/or increase the heat transfer efficiency of the overall process.

In one embodiment, the diluted draw solution may be contacted with one side of a further membrane, while a further solution having a higher solute concentration than the diluted draw solution is contacted with the other side of the membrane. As the diluted draw solution has a higher solvent concentration than the further solution, solvent from the diluted draw solution flows across the membrane to dilute the further solution by direct osmosis. Like the initial draw solution, the further solution may consist essentially of a selected solute dissolved in a selected solvent. Thus, by repeating this direct osmosis step one or more times, the composition of the solution introduced into the cooling tower may be better controlled.

The diluted draw solution from the direct osmosis step is preferably used as the feed solution for the cooling tower. The cooling tower preferably comprises supporting material or decking from which solvent (e.g. water) can evaporate. The supporting material is preferably porous and may advantageously have a large surface area. The supporting material may be made from plastic, metal, ceramic and natural materials, such as wood.

In use, the feed solution is contacted with the supporting material. A gas, such as air, may then be passed through the wet supporting material causing the solvent of the feed solution to evaporate, forming a concentrated feed solution. The temperature of the feed solution can be reduced as a result of the evaporative cooling. The cooled solution may be used as a coolant in a heat exchanger, for example, to remove heat from a heat source.

The concentrated feed solution may be re-used as the draw solution to remove solvent from the source solution. Optionally, the concentrated feed solution may be re-used as the draw solution after one or more intermediate steps. For example, the concentrated draw solution may be used to remove heat from a heat source prior to being reused as a draw solution. Alternatively, the draw solution may be used to remove heat from a heat source after it has been used to draw solvent from the source solution in the direct osmosis step.

As evaporation occurs in the cooling tower, the feed solution becomes increasingly concentrated and, after a period of use, contaminants may build-up in the feed solution. Such contaminants may include solutes and/or suspended components that flow across the membrane in the direct osmosis step, for example, against the osmotic gradient. Examples of such solutes include ions, such as sodium, calcium, magnesium, potassium, barium, strontium, chloride, sulphate, nitrate, bicarbonate, carbonate, bromide and fluoride ions. Particularly when present above certain concentrations, such solutes can cause scaling and/or fouling. Accordingly, to reduce the risk of scaling and/or fouling, a portion of the concentrated feed solution is removed from the cooling tower as blow-down.

In addition to unwanted contaminants and/or solutes, the blow-down may contain desirable solutes (e.g. osmotic agents) and additives, such as scale inhibitors, corrosion inhibitors, biocides and/or dispersants. For example, in one embodiment, the blow-down contains desirable components, such as magnesium sulphate and, preferably, additive(s), such as scale inhibitors, corrosion inhibitors, biocides and/or dispersants.

By selecting a membrane having appropriate characteristics, it is possible to retain at least some of these desirable components on the retentate-side of the membrane, while allowing unwanted components, such as sodium and chloride ions, to pass across the membrane together with the solvent as filtrate. For example, in one embodiment, the blow-down contains magnesium sulphate and sodium chloride. When the blow-down is passed through the membrane, magnesium sulphate is largely prevented from passing through the pores of the membrane, while sodium and chloride ions are allowed to preferentially pass through the membrane. The filtrate solution, therefore, is a dilute solution of sodium chloride, (with some magnesium sulphate) while the retentate is a concentrated solution of magnesium sulphate (with some sodium chloride).

In a preferred embodiment, nanofiltration membranes are employed to retain some of the desirable constituents on the retentate side of the membrane, while allowing some of the undesirable constituents to pass across the membrane together with some of the solvent as filtrate.

Nanofiltration is particularly suitable for separating the large solute species of the blowdown from the remainder of the solution.

Suitable nanofiltration membranes include crosslinked polyamide membranes, such as crosslinked aromatic polyamide membranes. The membranes may be cast as a "skin layer" on top of a support formed, for example, of a microporous polymer sheet. The resulting membrane has a composite structure (e.g. a thin-film composite structure).

Typically, the separation properties of the membrane are controlled by the pore size and electrical charge of the "skin layer". The membranes may be suitable for the separation of components that are 0.01 to 0.001 microns in size and molecular weights of 100 mol−1 or above, for example, 200 gmol−1 and above.

As well as filtering particles according to size, nanofiltration membranes can also filter particles according to their electrostatic properties. For example, in certain embodiments, the surface charge of the nanofiltration membrane may be controlled to provide desired filtration properties.

For example, the inside of at least some of the pores of the nanofiltration membrane may be negatively charged, restricting or preventing the passage of anionic species, particularly multivalent anions.

Examples of suitable nanofiltration membranes include Desal-5 (Desalination Systems, Escondido, California), SR 90, NF 90, NF 70, NF 50, NF 40 and NF 40 HF membranes (FilmTech Corp., Minneapolis, Minn), SU 600 membrane (Toray, Japan) and NRT 7450 and NTR 7250 membranes (Nitto Electric, Japan).

The nanofiltration membranes may be packed as membrane modules. Spiral wound membranes, and tubular membranes, for example, enclosed in a shell may be employed.

Alternatively, the membranes may be provided as a plate or in a frame

The concentrated blow-down solution from the retentate-side of the membrane is contacted with one side of a second membrane, while a solution having a lower solute concentration than the concentrated blow-down solution with the opposite side of the second membrane, such that solvent flows across the second membrane to dilute the concentrated blow down solution by direct osmosis.

This direct osmosis step may be carried out using the same direct osmosis unit used to draw solvent from the source solution into the draw solution. Alternatively, this direct osmosis step may be carried out in a dedicated unit used to treat the blow-down stream. When a separate direct osmosis unit is used, the direct osmosis membrane may have the characteristics mentioned above.

In any of the direct osmosis steps of the present invention, solvent preferably passes across the membrane in liquid form.

The diluted blow-down solution is then introduced into the cooling tower.

These and other aspects of the present invention will now be described with reference to the drawing which is a schematic diagram of a flow scheme for carrying out a process according to an embodiment of the present invention.

The drawing depicts a flow scheme for carrying out a process according to an embodiment of the present invention. The scheme depicts a cooling tower 10, a direct osmosis unit 12, a nanofiltration unit 14 and a heat exchanger 16.

The numbers on the drawing (FIG. 1) depict the following features:

| | |
|---|---|
| 30 | Drift loss |
| 32 | Evaporation |
| 34 | Recirculated Osmotic Agent |
| 36 | Concentrated Osmotic Agent |
| 38 | Reject from manipulated osmosis system |
| 40 | Blowdown |
| 42 | Seawater or brackish water feed. |

Seawater 18 is contacted with one side of a selective membrane in the direct osmosis unit 12. A magnesium sulphate solution 20 containing anti-scaling agents is contacted with the opposite side of the selective membrane. The magnesium sulphate solution 20 has a higher solute concentration than the seawater and the difference in osmotic potential between the two solutions causes water to flow across the membrane to dilute the magnesium sulphate solution. Although sodium and chloride ions are largely prevented from passing across the membrane, some sodium chloride passes across the membrane and this contaminates the magnesium sulphate solution 20.

The diluted magnesium sulphate solution 20 is used as a coolant in a heat exchanger 16. The temperature of the magnesium sulphate solution 20 increases as it removes heat from the system to be cooled.

The hot magnesium sulphate solution 20 is then introduced into the cooling tower 10. In the cooling tower 10, the magnesium sulphate solution 20 is dripped or sprayed through decking, while air is blown through the decking, thereby evaporating water from the solution. The evaporation lowers the temperature of the magnesium sulphate solution 20 and the cooled magnesium sulphate solution 20 is recycled to the direct osmosis unit 12. As more water is removed from the magnesium sulphate solution, the solution becomes increasingly concentrated. Accordingly, the sodium chloride concentration in the magnesium sulphate solution 20 increases and this can increase the risk of fouling in the system.

To reduce the risk of fouling, a portion of the concentrated magnesium sulphate solution is removed from the cooling tower 10 as blow-down 22. The blow-down stream is passed through a membrane in the nanofiltration unit 14. The pores of the nanofiltration membrane are sized to allow sodium and chloride ions to pass through the membrane as part of the filtrate. Magnesium sulphate ions and the anti-scaling additives, however, are too large to pass through the pores of the membrane and are retained on the retentate side of the membrane. This concentrated retentate solution is introduced into the direct osmosis unit 12 and used to draw water from seawater by direct osmosis.

The filtrate from the nanofiltration unit 14 is discarded.

The invention claimed is

1. A process for operating a cooling apparatus, said process comprising;
    preparing a draw solution by dissolving one or more water-soluble salts in water;
    positioning a first membrane between a source solution and the draw solution, wherein the draw solution is prepared having a higher solute concentration than the source solution, such that solvent and ions from the source solution flow across the first membrane to dilute the draw solution, the ions selected from the group consisting of sodium, calcium, magnesium, potassium, barium, strontium, chloride, sulphate, nitrate, bicarbonate, carbonate, bromide and fluoride ions;
    introducing the diluted draw solution into the cooling tower as a feed solution;
    evaporating, in the cooling tower, water from the feed solution to produce a concentrated solution having a greater concentration of ions than the diluted draw solution;
    removing (i) a portion of the concentrated solution as blow-down, and returning (ii) a portion of the concentrated solution to the cooling tower;
    passing at least a portion of the blow-down through a second membrane, such that some of the solute in the blow-down is retained as a concentrated blow-down solution on the retentate-side of the second membrane, and at least some of the ions pass through the second membrane into the filtrate side of the second membrane, and the filtrate with the ions is discarded;
    contacting at least a portion of the concentrated blow-down solution with one side of the first membrane and contacting a solution having a lower solute concentration than the combined concentrated blow-down solution and the return from the cooling tower with the opposite side of the first membrane, such that water flows across the first membrane to dilute the concentrated blow-down solution by direct osmosis, and
    re-introducing the diluted blow-down solution to the cooling tower.

2. A process as claimed in claim 1, wherein the source solution comprises seawater, brackish water, river water, lake water and/or waste water.

3. A process as claimed in claim 1, wherein the salt is magnesium sulphate.

4. A process as claimed in claim 1, wherein the second membrane is a nanofiltration membrane.

5. A process as claimed in claim 1, wherein an additive selected from a scale inhibitor, corrosion inhibitor, biocide and/or dispersant is included in the draw solution.

6. A process as claimed in claim 1, wherein the draw solution is formed so as to be free from components that cause fouling of the cooling tower.

7. A process as claimed in claim 1, wherein the first membrane is a direct osmosis membrane.

8. A process as claimed in claim 1 comprising introducing the feed solution into the top of the cooling tower; and
    dripping the feed solution through decking.

9. A process as claimed in claim 1 wherein the cooling tower comprises decking through which the feed solution drips, and the evaporating step comprises blowing air through decking; and
    causing some of the water in the feed solution to evaporate.

10. A process as claimed in claim 1 comprising
    passing the diluted draw solution through a heat exchanger to heat the diluted draw solution; and
    introducing the heated diluted draw solution into the cooling tower as the feed solution.

* * * * *